(12) United States Patent
Guo

(10) Patent No.: US 11,387,522 B2
(45) Date of Patent: Jul. 12, 2022

(54) MULTILAYER SEPARATOR AND DEVICE USING THE SAME

(71) Applicant: NINGDE AMPEREX TECHNOLOGY LIMITED, Ningde (CN)

(72) Inventor: DongYang Guo, Ningde (CN)

(73) Assignee: NINGDE AMPEREX TECHNOLOGY LIMITED, Ningde (CN)

(*) Notice: Subject to any disclaimer, the term of this patent is extended or adjusted under 35 U.S.C. 154(b) by 230 days.

(21) Appl. No.: 16/715,241

(22) Filed: Dec. 16, 2019

(65) Prior Publication Data
US 2021/0036292 A1 Feb. 4, 2021

(30) Foreign Application Priority Data
Jul. 31, 2019 (CN) .......................... 201910699671.4

(51) Int. Cl.
*H01M 50/449* (2021.01)
*H01M 50/429* (2021.01)
*H01M 50/44* (2021.01)
*H01M 50/446* (2021.01)
*H01M 50/411* (2021.01)

(52) U.S. Cl.
CPC ....... *H01M 50/449* (2021.01); *H01M 50/411* (2021.01); *H01M 50/4295* (2021.01); *H01M 50/44* (2021.01); *H01M 50/446* (2021.01)

(58) Field of Classification Search
None
See application file for complete search history.

(56) References Cited

U.S. PATENT DOCUMENTS

| | | | | |
|---|---|---|---|---|
| 5,565,281 A * | 10/1996 | Yu | .............. | B32B 5/18 429/62 |
| 5,691,047 A * | 11/1997 | Kurauchi | ............. | H01M 50/411 428/315.7 |
| 6,080,507 A * | 6/2000 | Yu | ........................ | B32B 27/32 429/62 |
| 2004/0033378 A1* | 2/2004 | Holzer | ................... | C08L 23/08 428/484.1 |
| 2009/0098450 A1* | 4/2009 | Kikuchi | ................. | B32B 27/32 429/145 |
| 2011/0192283 A1* | 8/2011 | Shimatani | .......... | B29C 44/5627 96/11 |
| 2013/0101888 A1* | 4/2013 | Katayama | ............ | H01M 50/411 429/144 |
| 2014/0004400 A1* | 1/2014 | Ueki | .................... | H01M 50/449 429/94 |
| 2014/0079980 A1* | 3/2014 | Halmo | ................. | H01M 50/451 429/144 |
| 2014/0212768 A1* | 7/2014 | Zhong | ................. | H01M 8/1025 429/317 |
| 2014/0221516 A1* | 8/2014 | Mikawa | ................. | B01D 71/26 521/134 |
| 2014/0349169 A1 | 11/2014 | Mizuno et al. | | |
| 2015/0183195 A1 | 7/2015 | Jeon et al. | | |
| 2018/0175353 A1* | 6/2018 | Saki | ..................... | H01M 50/411 |

FOREIGN PATENT DOCUMENTS

| | | |
|---|---|---|
| CN | 1447460 A | 10/2003 |
| CN | 1764688 A | 4/2006 |
| CN | 101511588 A | 8/2009 |
| CN | 101511589 A | 8/2009 |
| CN | 102917876 A | 2/2013 |
| CN | 102977394 A | 3/2013 |
| CN | 103078075 A | 5/2013 |
| CN | 103531735 A | 1/2014 |
| CN | C03956448 A | 7/2014 |
| CN | 104157817 A | 11/2014 |
| CN | 104600230 A | 5/2015 |
| CN | 106025149 A | 10/2016 |
| CN | 110429229 A | 11/2019 |
| EP | 0682376 A1 | 11/1995 |
| WO | 2012124093 X | 7/2014 |
| WO | WO 2016/204274 | * 12/2016 |

OTHER PUBLICATIONS

Chinese Second Office Action dated Oct. 20, 2020 in Chinese counterpart application 201910699671.4, 9 pages in Chinese.
Chinese First Office Action dated Mar. 13, 2020 in Chinese counterpart application 201910699671.4, 8 pages in Chinese.
PCT International Search Report dated Apr. 24, 2020 in PCT counterpart application PCT/CN2020/073585, 5 pages.

* cited by examiner

*Primary Examiner* — Anca Eoff
(74) *Attorney, Agent, or Firm* — Juan Carlos A. Marquez; Marquez IP Law Office, PLLC

(57) ABSTRACT

The present application relates to a multilayer separator and a device using the same. Specifically, the present application provides a multilayer separator comprising at least one first porous substrate and at least one second porous substrate, wherein the peeling strength between the first porous substrate and the second porous substrate is in a range of 2 N/m to 50 N/m, and the first porous substrate has an obturator temperature of lower than 135° C. The multilayer separator provided by the present application can effectively guarantee the safety and electrochemical performance of the electrochemical device.

15 Claims, 2 Drawing Sheets

MULTILAYER SEPARATOR AND DEVICE USING THE SAME

CROSS REFERENCE TO RELATED APPLICATIONS

The present application claims the benefit of priority from the China Patent Application No. 201910699671.4, filed on 31 Jul. 2019, the disclosure of which is hereby incorporated by reference in its entirety.

BACKGROUND

1. Field of the Invention

The present application relates to the field of energy storage, and more particularly to a multilayer separator and a device using the same.

2. Description of the Related Art

With the wide application of electronic devices such as cameras, digital cameras, mobile phones and laptops, the demand for electrochemical devices (e.g., lithium-ion batteries) is increasing. However, the technology concerning the safety of batteries is currently immature. Occasionally, there have been safety issues where the explosion of batteries is caused by external forces puncturing the battery when in use by users.

Under abnormal use conditions, the temperature inside the battery will rise sharply, and even thermal runaway will occur. Improving the thermal stability of the cathode, the anode or the electrolyte may have an adverse effect on the electrochemical performance of the battery, such as deterioration of rate performance, lithium precipitation and/or acceleration of cyclic attenuation. Therefore, improving the safety performance of the separator has become one of the research and development directions.

In view of this, it is necessary to provide an improved multilayer separator and a device using the same.

SUMMARY

The present application aims to solve at least one of problems in the related art to at least a certain extent by providing a multilayer separator.

According to one aspect of the present application, the present application provides a multilayer separator, comprising: at least one first porous substrate; and at least one second porous substrate, wherein the peeling strength between the first porous substrate and the second porous substrate is in a range of 2 N/m to 50 N/m, and the first porous substrate has an obturator temperature of lower than 135° C.

According to an embodiment of the present application, the second porous substrate has a broken membrane temperature of higher than 145° C.

According to an embodiment of the present application, the multilayer separator has a thickness of 5 μm to 30 μm, the thickness of the first porous substrate is 10% to 70% of the thickness of the multilayer separator, and the thickness of the second porous substrate is 30% to 90% of the thickness of the multilayer separator.

According to an embodiment of the present application, the multilayer separator has an air permeability of 50 s/100 cc to 1000 s/100 cc, the air permeability of the first porous substrate is 30% to 80% of the air permeability of the multilayer separator, and the air permeability of the second porous substrate is 20% to 70% of the air permeability of the multilayer separator.

According to an embodiment of the present application, the multilayer separator has an obturator temperature of lower than 135° C. and broken membrane temperature of higher than 145° C.

According to an embodiment of the present application, the material of the first porous substrate comprises at least one or more of high-density polyethylene (HDPE), low-density polyethylene (LDPE), linear low-density polyethylene (LLDPE), medium-density polyethylene (MDPE), ultra-high-molecular-weight polyethylene (UHMWPE) and polyethylene wax with an average molecular weight of 1000 g/mol to 20000 g/mol.

According to an embodiment of the present application, the material of the second porous substrate comprises at least one or more of ultrahigh-molecular-weight polyethylene (UHMWPE), high-density polyethylene (HDPE), polypropylene (PP), polyethylene terephthalate (PET), polyphenylene sulfide (PPS), cellulose, polyimide, polystyrene (PS), poly(4-methyl-1-pentene) (TPX), polymethyl methacrylate (PMMA), polyvinylidene fluoride (PVDF), polyvinylidene fluoride-hexafluoropropylene (PVDF-HFP), polytetrafluoroethylene (PTFE) and polysulfone.

According to an embodiment of the present application, the multilayer separator further comprises at least one coating on one side or two sides of the multilayer separator, and the coating comprises one or two of inorganic particles and polymers.

According to another aspect of the present application, the present application provides an electrochemical device, comprising: a cathode; an anode; and the multilayer separator according to the present application, the multilayer separator being located between the cathode and the anode.

According to another aspect of the present application, the present application provides an electronic device, comprising the electrochemical device according to the present application.

Additional aspects and advantages of the present application will be described or shown in the following description or interpreted by implementing the embodiments of the present application.

BRIEF DESCRIPTION OF THE DRAWINGS

The following will briefly illustrate the drawings. Drawings necessary to describe the embodiments of the present application or the prior art will be briefly illustrated so as to facilitate the description of the embodiments of the present application. Obviously, the drawings described below only show some embodiments of the present application. For those skilled in the art, the drawings of other embodiments can still be obtained according to the structures illustrated in the drawings without any creative effort.

DETAILED DESCRIPTION

Figure 1:
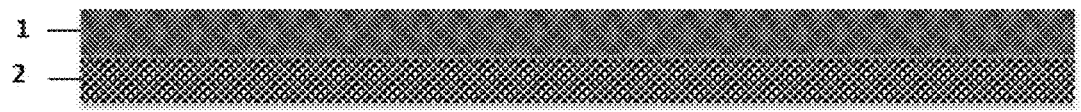
FIG. 1 illustrates a structural schematic view of a two-layer separator according to one embodiment of the present application.

The embodiments of the present application will be described in detail below. Throughout the specification, the same or similar components and components having the same or similar functions are denoted by similar reference numerals. The embodiments described herein with respect to the drawings are illustrative and graphical, and are used for providing a basic understanding of the present application. The embodiments of the present application should not be interpreted as limitations to the present application.

In this application, unless otherwise specified or limited, when a first feature is "above" or "below" a second feature in a structure, the structure may include an embodiment in which the first feature is in direct contact with the second feature, and the structure may also include another embodiment in which the first feature is not in direct contact with the second feature, but is in contact by using an additional feature formed therebetween. Furthermore, when the first feature is "above" the second feature, "on" the second feature, or "on the top of the second feature", it may include an embodiment in which the first feature is directly or obliquely located "above" the second feature, "on" the second feature, or "on the top of the second feature", or it only represents the height of the first feature being higher than the height of the second feature; and when the first feature is "below" the second feature, "under" the second feature, or "on the bottom of the second feature", it may include an embodiment in which the first feature is directly or obliquely located "below" the second feature, "under" the second feature, or "on the bottom of the second feature", or it only represents the height of the first feature being lower than the height of the second feature.

As used herein, the term "about" is used to describe and explain minor changes. When being used in combination with an event or circumstance, the term may refer to an example in which the event or circumstance occurs precisely, and an example in which the event or circumstance occurs approximately. For example, when being used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. In addition, sometimes, a quantity, a ratio, and another value are presented in a range format in the present application. It should be appreciated that such range formats are for convenience and conciseness, and should be flexibly understood as including not only values explicitly specified to range constraints, but also all individual values or sub-ranges within the ranges, like explicitly specifying each value and each sub-range.

An separator is usually used between a cathode and an anode of a lithium-ion battery to isolate the cathode and the anode while transmitting lithium ions, so as to prevent a short circuit. However, under abnormal use conditions, the temperature inside the electrode assembly of the lithium-ion battery will rise sharply, resulting in a large degree of thermal shrinkage or even melting of some separator materials. Once a short circuit occurs, thermal runaway will occur inside the lithium-ion battery, resulting in fire, explosion and other safety problems.

Thermal effects in lithium-ion batteries can usually be improved by the following methods:

(1) Improving the thermal stability of the cathode and/or anode: coating special materials on the surface of the cathode and/or anode materials to reduce the chemical reaction between electrode materials and electrolyte, thereby reducing the heat generated inside the lithium-ion batteries.

(2) Improving the thermal stability of the electrolyte: adding special film-forming additives to the electrolyte to reduce the chemical reaction between the electrode materials and the electrolyte, thus reducing the heat generated inside the lithium-ion batteries.

(3) Improving the thermal stability of the separator.

Improving the thermal stability of the cathode, anode and/or electrolyte requires modification of the components, which may adversely affect the electrochemical performance of the lithium-ion batteries, such as resulting in deterioration of rate performance, lithium precipitation and/or acceleration of cyclic attenuation. Therefore, the purpose of the present application is to solve the above problems by improving the thermal stability of the separator.

According to one aspect of the present application, the present application provides a multilayer separator, comprising: at least one first porous substrate; and at least one second porous substrate, wherein the peeling strength between the first porous substrate and the second porous substrate is in a range of 2 N/m to 50 N/m.

There is a specific peeling strength between the first porous substrate and the second porous substrate of the multilayer separator in the present application, which is critical to the role of the separator. When the peeling strength between the first porous substrate and the second porous substrate is smaller than 2 N/m, the interlayer slippage is prone to occur, and the edge tearing or delamination is prone to occur during the preparation and processing of the separator; when the peeling strength between the first porous substrate and the second porous substrate is greater than 50 N/m, the interlayer bonding strength is too strong, such that the second porous substrate will inhibit the obturator process of the first porous substrate, which results in the failure of the first porous substrate to fully play its role. Therefore, by designing the specific peeling strength between the first porous substrate and the second porous substrate of the multilayer separator, the multilayer separator provided by the present application can guarantee the safety and electrochemical performance of the lithium-ion battery.

According to the present application, under certain temperature conditions, close of pores or break of membranes may occur in the porous substrate. If the obturator temperature of the porous substrate is too high, it may be difficult to close pores under abnormal conditions, which leads to the continuous thermogenic reaction inside the lithium-ion battery, further temperature rise, and ultimately shrinkage or melting, thus the porous substrate cannot suppress the thermal runaway of the lithium-ion battery. If the broken membrane temperature of the porous substrate is too low, the multilayer separator is easy to break under high heat, it is difficult to exert separator performance, and thus it is easy to cause a short-circuit risk.

According to the present application, the multilayer separator provided by the present application comprises two kinds of porous substrates, one is the first porous substrate, and the other is the second porous substrate. According to the embodiment illustrated in FIG. 1, the multilayer separator provided by the present application may comprise a first porous substrate 1 and a second porous substrate 2. According to the embodiment illustrated in FIG. 2, the multilayer separator provided by the present application may also comprise one first porous substrate 1 and two second porous substrates 2.

According to the embodiment of the present application, when the lithium-ion battery generates high heat, the first porous substrate will close the pores to effectively block the ion path inside the lithium-ion battery, resulting in an increase in the impedance of the lithium-ion battery, thereby inhibiting the increase of short-circuit current and further avoiding the thermal runaway of the lithium-ion battery. In another aspect, according to the embodiment of the present application, the second porous substrate can effectively maintain the thermal integrity of the separator and further prevent the occurrence of a short circuit. At the same time, the electrochemical performance of the lithium-ion battery will not be adversely affected. Therefore, according to the first porous substrate and the second porous substrate in the present application, the multilayer separator provided by the present application can further guarantee the safety and electrochemical performance of the lithium-ion battery.

In some embodiments, the first porous substrate has an obturator temperature of lower than 135° C. In some embodiments, the obturator temperature of the first porous substrate is in a range of 100° C. to 135° C. In some embodiments, the obturator temperature of the first porous substrate is in a range of 110° C. to 135° C. In some embodiments, the obturator temperature of the first porous substrate is in a range of 120° C. to 135° C. In some embodiments, the obturator temperature of the first porous substrate is in a range of 130° C. to 135° C. In some embodiments, the first porous substrate has an obturator temperature of 131° C.

In some embodiments, the material of the first porous substrate includes, but not limited to, at least one of the following materials: high-density polyethylene (HDPE), low-density polyethylene (LDPE), linear low-density polyethylene (LLDPE), medium-density polyethylene (MDPE), ultrahigh-molecular-weight polyethylene (UHMWPE) and polyethylene wax with an average molecular weight of 1000 g/mol to 20000 g/mol.

In some embodiments, the second porous substrate has a broken membrane temperature of higher than 145° C. In some embodiments, the broken membrane temperature of the second porous substrate is in a range of 145° C. to 240° C. In some embodiments, the broken membrane temperature of the second porous substrate is in a range of 145° C. to 230° C. In some embodiments, the broken membrane temperature of the second porous substrate is in a range of 145° C. to 220° C. In some embodiments, the broken membrane temperature of the second porous substrate is in a range of 145° C. to 210° C. In some embodiments, the broken membrane temperature of the second porous substrate is in a range of 145° C. to 200° C. In some embodiments, the broken membrane temperature of the second porous substrate is in a range of 145° C. to 190° C. In some embodiments, the broken membrane temperature of the second porous substrate is in a range of 145° C. to 180° C. In some embodiments, the broken membrane temperature of the second porous substrate is in a range of 145° C. to 170° C. In some embodiments, the broken membrane temperature of the second porous substrate is in a range of 145° C. to 160° C. In some embodiments, the second porous substrate has a broken membrane temperature of 155° C.

In some embodiments, the material of the second porous substrate includes, but not limited to, at least one of the following materials: ultrahigh-molecular-weight polyethylene (UHMWPE), high-density polyethylene (HDPE), polypropylene (PP), polyethylene terephthalate (PET), polyphenylene sulfide (PPS), cellulose, polyimide, polystyrene (PS), poly(4-methyl-1-pentene) (TPX), polymethyl methacrylate (PMMA), polyvinylidene fluoride (PVDF), polyvinylidene fluoride-hexafluoropropylene (PVDF-HFP), polytetrafluoroethylene (PTFE) and polysulfone.

The thickness, air permeability, obturator temperature, broken membrane temperature and porosity of the multilayer separator are related to the first porous substrate and the second porous substrate. In some embodiments, the multilayer separator has a thickness of 5 μm to 30 μm. In some embodiments, the multilayer separator has a thickness of 8 μm to 20 μm. In some embodiments, the multilayer separator has a thickness of 8 μm to 18 μm. In some embodiments, the multilayer separator has a thickness of 8 μm to 16 μm. In some embodiments, the multilayer separator has a thickness of 8 μm to 14 μm. In some embodiments, the multilayer separator has a thickness of 12 μm.

In some embodiments, the thickness of the first porous substrate is 10% to 70% of the thickness of the multilayer separator, and the thickness of the second porous substrate is 30% to 90% of the thickness of the multilayer separator. In some embodiments, the thickness of the first porous substrate is 20% to 60% of the thickness of the multilayer separator, and the thickness of the second porous substrate is 40% to 80% of the thickness of the multilayer separator. In some embodiments, the thickness of the first porous substrate is 30% to 50% of the thickness of the multilayer separator, and the thickness of the second porous substrate is 50% to 70% of the thickness of the multilayer separator. In some embodiments, the thickness of the first porous substrate is 40% to 70% of the thickness of the multilayer separator, and the thickness of the second porous substrate is 30% to 60% of the thickness of the multilayer separator.

In some embodiments, the multilayer separator has an air permeability of 50 s/100 cc to 1000 s/100 cc. In some embodiments, the multilayer separator has an air permeability of 100 s/100 cc to 800 s/100 cc. In some embodiments, the multilayer separator has an air permeability of 200 s/100 cc to 500 s/100 cc.

In some embodiments, the air permeability of the first porous substrate is 30% to 80% of the air permeability of the multilayer separator, and the air permeability of the second porous substrate is 20% to 70% of the air permeability of the multilayer separator. In some embodiments, the air permeability of the first porous substrate is 40% to 70% of the air permeability of the multilayer separator, and the air permeability of the second porous substrate is 30% to 60% of the air permeability of the multilayer separator. In some embodiments, the air permeability of the first porous substrate is 50% to 60% of the air permeability of the multilayer separator, and the air permeability of the second porous substrate is 50% to 40% of the air permeability of the multilayer separator.

In some embodiments, the multilayer separator has an obturator temperature of lower than 135° C. In some embodiments, the obturator temperature of the multilayer separator is in a range of 100° C. to 135° C. In some embodiments, the obturator temperature of the multilayer separator is in a range of 110° C. to 135° C. In some embodiments, the obturator temperature of the multilayer separator is in a range of 120° C. to 135° C. In some embodiments, the obturator temperature of the multilayer separator is in a range of 130° C. to 135° C. In some embodiments, the multilayer separator has an obturator temperature of 131° C.

In some embodiments, the multilayer separator has a broken membrane temperature of higher than 145° C. In some embodiments, the broken membrane temperature of the multilayer separator is in a range of 145° C. to 250° C. In some embodiments, the broken membrane temperature of the multilayer separator is in a range of 145° C. to 240° C. In some embodiments, the broken membrane temperature of the multilayer separator is in a range of 145° C. to 230° C. In some embodiments, the broken membrane temperature of the multilayer separator is in a range of 145° C. to 220° C. In some embodiments, the broken membrane temperature of the multilayer separator is in a range of 145° C. to 210° C. In some embodiments, the broken membrane temperature of the multilayer separator is in a range of 145° C. to 200° C. In some embodiments, the broken membrane temperature of the multilayer separator is in a range of 145° C. to 190° C. In some embodiments, the broken membrane temperature of the multilayer separator is in a range of 145° C. to 180° C. In some embodiments, the broken membrane temperature of the multilayer separator is in a range of 145° C. to 170° C. In some embodiments, the broken membrane temperature of the multilayer separator is in a range of 145° C. to 160° C. In some embodiments, the multilayer separator has a broken membrane temperature of 155° C.

In some embodiments, the multilayer separator has a porosity of 10% to 70%. In some embodiments, the multilayer separator has a porosity of 20% to 60%. In some embodiments, the multilayer separator has a porosity of 30% to 50%. Certain porosity can guarantee the effective ion conductivity of the multilayer separator.

In some embodiments, the multilayer separator further comprises at least one coating on one side or two sides of the multilayer separator, and the coating comprises one or two of inorganic particles and polymers.

In some embodiments, the inorganic particles include, but not limited to, at least one of the following materials: aluminum oxide, silicon dioxide, magnesium oxide, titanium oxide, hafnium dioxide, tin oxide, cerium dioxide, nickel oxide, zinc oxide, calcium oxide, zirconium oxide, yttrium oxide, silicon carbide, boehmite, aluminum hydroxide, magnesium hydroxide, calcium hydroxide and barium sulfate.

In some embodiments, the polymers include, but not limited to, at least one of the following materials: vinylidene fluoride-hexafluoropropylene copolymer, vinylidene fluoride-trichloroethylene copolymer, polystyrene, polyacrylate, polyacrylic acid, polyacrylate, polyacrylonitrile, polyvinyl pyrrolidone, polyvinyl acetate, ethylene-vinyl acetate copolymer, polyimide, polyethylene oxide, cellulose acetate, cellulose acetate butyrate, cellulose acetate propionate, cyanoethyl amylopectin, cyanoethyl polyvinyl alcohol, cyanoethyl cellulose, cyanoethyl sucrose, amylopectin, carboxymethyl cellulose, sodium carboxymethyl cellulose, lithium carboxymethyl cellulose, acrylonitrile-styrene-butadiene copolymer, polyphenyldimethyl phenylenediamine, polyvinyl alcohol, styrene-butadiene copolymer and polyvinylidene fluoride.

In some embodiments, the polymers form an adhesive porous coating distributed in a dotted or reticular shape.

The present application further provides an electrochemical device, comprising: a cathode; an anode; and the multilayer separator according to the present application, the multilayer separator being located between the cathode and the anode.

Cathode

The cathode comprises a cathode material, and the cathode material includes a cathode material capable of absorbing and releasing lithium (Li) (hereinafter referred to as "cathode material capable of absorbing/releasing lithium Li"). Examples of the cathode material capable of absorbing/releasing lithium (Li) may include lithium cobalt oxide, lithium nickel cobalt manganese oxide, lithium nickel cobalt aluminum oxide, lithium manganate, lithium manganese iron phosphate, lithium vanadium phosphate, oxylithium vanadium phosphate, lithium iron phosphate, lithium titanate and lithium-rich manganese-based material.

Specifically, the chemical formula of lithium cobalt oxide may be as chemical formula 1:

$$Li_xCo_aM1_bO_{2-c} \qquad \text{chemical formula 1}$$

where M1 is at least one selected from nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr) and silicon (Si), and the values of x, a, b and c are respectively in the following ranges: $0.8 \leq x \leq 1.2$, $0.8 \leq a \leq 1$, $0 \leq b \leq 0.2$ and $-0.1 \leq c \leq 0.2$;

The chemical formula of lithium nickel cobalt manganese oxide or lithium nickel cobalt aluminum oxide may be as chemical formula 2:

$$Li_yNi_dM2_eO_{2-f} \qquad \text{chemical formula 2}$$

where M2 comprises at least one or more of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), zirconium (Zr) and silicon (Si); and the values of y, d, E and f are respectively in the following ranges: $0.8 \leq y \leq 1.2$, $0.3 \leq d \leq 0.98$, $0.02 \leq e \leq 0.7$, and $-0.1 \leq f \leq 0.2$;

The chemical formula of lithium manganate may be as chemical formula 3:

$$Li_zMn_{2-g}M3_gO_{4-h} \qquad \text{chemical formula 3}$$

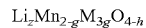

where M3 comprises at least one or more of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W); and the values of z, g and H are respectively in the following ranges: $0.8 \leq z \leq 1.2$, $0 \leq g \leq 1.0$ and $-0.2 \leq h \leq 0.2$.

Anode

The anode comprises an anode material, and the anode material includes an anode material capable of absorbing and releasing lithium (Li) (hereinafter referred to as "anode material capable of absorbing/releasing lithium Li"). Examples of the anode material capable of absorbing/releasing lithium (Li) can include a carbon material, a metal compound, an oxide, a sulfide, or a nitride of lithium including $LiN_3$, a lithium metal, a metal forming an alloy with lithium, and a polymer material.

Examples of the carbon material can includes low graphitized carbon, easily graphitized carbon, artificial graphite, natural graphite, mesocarbon microbeads, soft carbon, hard carbon, pyrolytic carbon, coke, vitreous carbon, an organic polymer compound sintered body, carbon fibers and active carbon. The coke can include pitch coke, needle coke and petroleum coke. The organic polymer compound sintered body refers to a material obtained by calcining a polymer material such as phenol plastic or furan resin at an appropriate temperature to carbonize the polymer material, and some of these materials are classified into low graphitized carbon or easily graphitized carbon. The polymer material can include polyacetylene and polypyrrole.

Among these anode materials capable of absorbing/releasing lithium (Li), a material whose charging and discharging voltages are close to the charging and discharging voltages of lithium metal is further selected. This is because if the charging and discharging voltages of the anode material are lower, the electrochemical device (for example, the lithium-ion battery) can more easily have higher energy density. The anode material can be selected from carbon materials because their crystal structures are only slightly changed during charging and discharging, thus good cycle characteristics and large charging and discharging capacities can be obtained. In particular, graphite may be selected because it can provide a large electrochemical equivalent and a high energy density.

In addition, the anode material capable of absorbing/releasing lithium (Li) can include elemental lithium metals, metal elements and semi-metal elements capable of forming alloys together with lithium (Li), alloys and compounds thereof, etc. Particularly, the anode material and the carbon material are used together because in this case, good cycle performance and high energy density can be obtained. In addition to the alloys including two or more metal elements, the alloys used here also include alloys including one or more metal elements and one or more semi-metal elements. The alloys may be in the form of a solid solution, an eutectic crystal (an eutectic mixture), an intermetallic compound, and a mixture thereof.

Examples of the metal element and the semimetal element may comprise tin (Sn), lead (Pb), aluminum (Al), indium (In), silicon (Si), zinc (Zn), antimony (Sb), bismuth (Bi), Cadmium (Cd), magnesium (Mg), boron (B), gallium (Ga), germanium (Ge), arsenic (As), silver (Ag), zirconium (Zr), ytterbium (Y) and hafnium (Hf). Examples of the above alloys and compounds may comprise a material having a chemical formula: $Ma_sMb_tLi_u$ and a material having a chemical formula: $Ma_pMc_qMd_r$. In these chemical formula, Ma denotes at least one of a metal element and a semimetal element capable of forming an alloy with lithium; Mb denotes at least one of the metal element and the semimetal element other than lithium and Ma; Mc denotes at least one of the non-metallic elements; Md represents at least one of the metal element and the semimetal element other than Ma; and s, t, u, p, q, and r satisfy $s>0$, $t\geq 0$, $u\geq 0$, $p>0$, $q>0$, and $r\geq 0$.

Further, an inorganic compound not including lithium (Li), such as $MnO_2$, $V_2O_5$, $V_6O_{13}$, NiS or MoS, can be used in the anode.

Electrolyte

The above lithium-ion battery further includes an electrolyte, the electrolyte can be one or more of a gel electrolyte, a solid electrolyte and an electrolytic solution, and the electrolytic solution includes a lithium salt and a non-aqueous solvent.

The lithium salt is one or more selected from the group consisting of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB and lithium difluoroborate. In one embodiment of the present application, $LiPF_6$ is selected as the lithium salt due to its high ionic conductivity and improved cycle characteristics.

The non-aqueous solvent can be a carbonate compound, a carboxylate compound, an ether compound, other organic solvent or a combination thereof.

The carbonate compound can be a chain carbonate compound, a cyclic carbonate compound, a fluorocarbonate compound or a combination thereof.

Examples of the chain carbonate compound include diethyl carbonate (DEC), dimethyl carbonate (DMC), dipropyl carbonate (DPC), methyl propyl carbonate (MPC), ethyl propyl carbonate (EPC), methyl ethyl carbonate (MEC), and a combination thereof. Examples of the cyclic carbonate compound are ethylene carbonate (EC), propylene carbonate (PC), butylene carbonate (BC), vinyl ethylene carbonate (VEC), and a combination thereof. Examples of the fluorocarbonate compound are fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethylene carbonate, 1-fluoro-1-methylethylene carbonate, 1,2-difluoro-1-methylethylene carbonate, 1,1,2-trifluoro-2-methylethylene carbonate, trifluoromethylethylene carbonate, and a combination thereof.

Examples of the carboxylate compound are methyl acetate, ethyl acetate, n-propyl acetate, t-butyl acetate, methyl propionate, ethyl propionate, propyl propionate, γ-butyrolactone, decalactone, valerolactone, mevalonolactone, caprolactone, methyl formate and combinations thereof.

Examples of the ether compound are dibutyl ether, tetraethylene glycol dimethyl ether, diethylene glycol dimethyl ether, 1,2-dimethoxyethane, 1,2-diethoxyethane, ethoxymethoxyethane, 2-methyltetrahydrofuran, tetrahydrofuran, and a combination thereof.

Examples of other organic solvents are dimethyl sulfoxide, 1,2-dioxolane, sulfolane, m ethyl sulfolane, 1,3-dimethyl-2-imidazolldone, N-methyl-2-pyrrolidone, formamide, dimethyl formamide, acetonitrile, trimethyl phosphate, triethyl phosphate, trioctyl phosphate, phosphate ester, and a combination thereof.

The electrochemical device of the present invention includes any device in which an electrochemical reaction occurs, and specific examples include all kinds of primary batteries, secondary batteries, fuel cells, solar cells, or capacitors. In particular, the electrochemical device is a lithium secondary battery including a lithium metal secondary battery, a lithium ion secondary battery, a lithium polymer secondary battery or a lithium ion polymer secondary battery.

The present application further provides an electronic device, comprising the electrochemical device according to the present application.

The application of the electrochemical device in the present application is not specifically limited and may be used for any electronic device known in the prior art. In some embodiments, the electronic device of the present application may include, but not limited to: a notebook computer, a pen-input computer, a mobile computer, an e-book player, a portable phone, a portable fax machine, a portable copier, a portable printer, a head-mounted stereo headphone, a video recorder, an LCD TV, a portable cleaner, a portable CD player, a Mini disc, a transceiver, an electronic notebook, a calculator, a memory card, a portable recorder, a radio, a backup power source, a motor, a vehicle, a motorcycle, a motorbicycle, a bicycle, a lighting apparatus, a toy, a game console, a clock, an electric tool, a flashing light, a camera, a large battery for household use, and a lithium ion capacitor.

Hereinafter, the lithium-ion battery is exemplified as an example and the preparation of the lithium-ion battery is described in conjunction with a specific embodiment. Those skilled in the art would understand that the preparation method described in the present application is merely an example, and any other suitable preparation methods fall within the scope of the present application.

EXAMPLES

Examples of the lithium-ion battery according to the present application and comparative examples for performance evaluation are described below.

(1) Preparation of Lithium-Ion Battery

1. Method for Preparing Multilayer Separator

During the preparation of a multilayer separator in the examples of the present application and the comparative examples, different raw materials and paraffin oil plasticizers were added to two independent extruder systems (a first extruder and a second extruder) and were extruded through a three-layer T-die. The proportion of each layer was controlled by adjusting the three-layer die head. The outer layer of the separator was composed of the raw material added to the first extruder, and the middle layer of the separator was composed of the raw material added to the second extruder. When the separator consisted of three layers, the two outer layers were the second porous substrate and the middle layer was the first porous substrate.

During the preparation of a single-layer separator in the comparative examples, raw materials and paraffin oil plasticizers were added to an extruder system and were extruded through a three-layer T-die.

After extrusion, cooling was performed by a casting roll to form a film Then longitudinal drawing was performed at 80° C.-120° C. Then transverse drawing was performed. Then extraction by dichloromethane, drying by hot air, secondary heat setting and winding were performed to obtain the required separator.

2. Preparation Method of Lithium-Ion Battery

Cathode slurry was prepared by dissolving lithium cobalt oxide, conductive carbon (Super P) and binder polyvinylidene fluoride in an N-methyl pyrrolidone solvent system according to a weight ratio of 94:3:3 and performing full stirring for uniform mixing. The cathode slurry was coated on an aluminum foil, which was then dried, cold-pressed and sliced to obtain the cathode.

Anode slurry was prepared by dissolving anode active substance artificial graphite, a conductive agent Super P, binder styrene-butadiene rubber and thickener sodium carboxymethyl cellulose in deionized water solution system according to a weight ratio of 97:1:1.5:0.5 and performing full stirring for uniform mixing. The anode slurry was coated on a copper foil, which was then dried, cold-pressed and sliced to obtain the anode.

A solution prepared from a lithium salt $LiPF_6$ and a nonaqueous organic solvent (ethylene carbonate (EC):diethyl carbonate (DEC):polypropylene carbonate (PC):propyl propionate (PP):vinylene carbonate (VC))=20:30:20:28:2, mass ratio) in a mass ratio of 8:92 was used as an electrolytic solution of the lithium-ion battery.

The cathode, the separator and the anode were sequentially stacked, such that the separator was located between the cathode and the anode, and winding was performed to obtain an electrode assembly. The electrode assembly was placed in an outer package, electrolyte was injected and packaged, and then formation was performed to obtain a final lithium-ion battery product.

Examples 1-25 and Comparative Examples 1-4 were prepared according to the above method, and the preparation conditions in the examples and comparative examples were as follows:

| Example | Raw material of second porous substrate | Raw material of first porous substrate | Die orifice extrusion amount of extruder kg/h | Extrusion temperature of second porous substrate ° C. | Extrusion temperature of first porous substrate ° C. | Thickness proportion of first porous substrate | Thickness proportion of second porous substrate | Longitudinal drawing ratio | Transverse drawing ratio |
|---|---|---|---|---|---|---|---|---|---|
| 1 | UHMWPE (weight-average molecular weight 60 W, melting point 140° C.) | Low-melting-point polyethylene (tveight-average molecular weight 25 W, melting point 130° C.) | 230 | 200 | 170 | 42% | 58% | 6.0 | 6.0 |
| 2 | UHMWPE (weight-average molecular weight 60 W, melting point 140° C.) | Low-melting-point polyethylene (weight-average molecular weight 25 W, melting point 130° C.) | 230 | 210 | 180 | 42% | 58% | 6.0 | 6.0 |
| 3 | UHMWPE (weight-average molecular weight 60 W, melting point 140° C.) | Low-melting-point polyethylene (weight-average molecular weight 25 W, melting point 130° C.) | 230 | 220 | 190 | 42% | 58% | 6.0 | 6.0 |
| 4 | UHMWPE (weight-average molecular weight 60 W, melting point 140° C.) | Low-melting-point polyethylene (weight-average molecular weight 25 W, melting point 130° C.) | 230 | 225 | 195 | 42% | 58% | 6.0 | 6.0 |
| 5 | UHMWPE (weight-average molecular weight 60 W, melting point 140° C.) | Low-melting-point polyethylene (weight-average molecular weight 25 W, melting point 130° C.) | 230 | 230 | 200 | 42% | 58% | 6.0 | 6.0 |

-continued

| | | | | | | | | | |
|---|---|---|---|---|---|---|---|---|---|
| 6 | UHMWPE (weight-average molecular weight 60 W, melting point 140° C.) | Low-melting-point polyethylene (weight-average molecular weight 25 W, melting point 130° C.) | 230 | 235 | 210 | 42% | 58% | 6.0 | 6.0 |
| 7 | UHMWPE (weight-average molecular weight 60 W, melting point 140° C.) | Low-melting-point polyethylene (weight-average molecular weight 25 W, melting point 130° C.) | 230 | 220 | 190 | 42% | 58% | 6.0 | 6.0 |
| 8 | UHMWPE (weight-average molecular weight 60 W, melting point 140° C.) | Low-melting-point polyethylene (weight-average molecular weight 25 W, melting point 130° C.) | 100 | 220 | 190 | 42% | 58% | 6.0 | 6.0 |
| 9 | UHMWPE (weight-average molecular weight 60 W, melting point 140° C.) | Low-melting-point polyethylene (weight-average molecular weight 25 W, melting point 130° C.) | 130 | 220 | 190 | 42% | 58% | 6.0 | 6.0 |
| 10 | UHMWPE (weight-average molecular weight 60 W, melting point 140° C.) | Low-melting-point polyethylene (weight-average molecular weight 25 W, melting point 130° C.) | 180 | 220 | 190 | 42% | 58% | 6.0 | 6.0 |
| 11 | UHMWPE (weight-average molecular weight 60 W, melting point 140° C.) | Low-melting-point polyethylene (weight-average molecular weight 25 W, melting point 130° C.) | 300 | 220 | 190 | 42% | 58% | 6.0 | 6.0 |
| 12 | UHMWPE (weight-average molecular weight 60 W, melting point 140° C.) | Low-melting-point polyethylene (weight-average molecular weight 25 W, melting point 130° C.) | 400 | 220 | 190 | 42% | 58% | 6.0 | 6.0 |
| 13 | UHMWPE (weight-average molecular weight 60 W, melting point 140° C.) | Low-melting-point polyethylene (weight-average molecular weight 25 W, melting point 130° C.) | 230 | 220 | 190 | 5% | 95% | 6.0 | 6.0 |
| 14 | UHMWPE (weight-average molecular weight 60 W, melting point 140° C.) | Low-melting-point polyethylene (weight-average molecular weight 25 W, melting point 130° C.) | 230 | 220 | 190 | 10% | 90% | 6.0 | 6.0 |
| 15 | UHMWPE (weight-average molecular weight 60 W, melting point 140° C.) | Low-melting-point polyethylene (weight-average molecular weight 25 W, melting point 130° C.) | 230 | 220 | 190 | 25% | 75% | 6.0 | 6.0 |
| 16 | UHMWPE (weight-average molecular weight 60 W, melting point 140° C.) | Low-melting-point polyethylene (weight-average molecular weight 25 W, melting point 130° C.) | 230 | 220 | 190 | 58% | 42% | 6.0 | 6.0 |
| 17 | UHMWPE (weight-average molecular weight 60 W, melting point 140° C.) | Low-melting-point polyethylene (weight-average molecular weight 25 W, melting point 130° C.) | 230 | 220 | 190 | 70% | 30% | 6.0 | 6.0 |
| 18 | UHMWPE (weight-average molecular weight 60 W, melting point 140° C.) | Low-melting-point polyethylene (weight-average molecular weight 30 W, melting point 109° C.) | 230 | 220 | 190 | 42% | 58% | 6.0 | 6.0 |

-continued

| | Raw material of second porous substrate | Raw material of first porous substrate | Die orifice extrusion amount of extruder kg/h | Extrusion temperature of second porous substrate ° C. | Extrusion temperature of first porous substrate ° C. | Thickness proportion of first porous substrate | Thickness proportion of second porous substrate | Longitudinal drawing ratio | Transverse drawing ratio |
|---|---|---|---|---|---|---|---|---|---|
| 19 | UHMWPE (weight-average molecular weight 60 W, melting point 140° C.) | Low-melting-point polyethylene (weight-average molecular weight 30 W, melting point 120° C.) | 230 | 220 | 190 | 42% | 58% | 6.0 | 6.0 |
| 20 | UHMWPE (weight-average molecular weight 60 W, melting point 140° C.) | Low-melting-point polyethylene (weight-average molecular weight 40 W, melting point 135° C.) | 230 | 220 | 190 | 42% | 58% | 6.0 | 6.0 |
| 21 | UHMWPE (weight-average molecular weight 60 W, melting point 129° C.) | Low-melting-point polyethylene (weight-average molecular weight 25 W, melting point 130° C.) | 230 | 220 | 190 | 42% | 58% | 6.3 | 6.4 |
| 22 | UHMWPE (weight-average molecular weight 60 W, melting point 140° C.) + polypropylene (weight-average molecular weight 30 W, melting point 172° C.) | Low-melting-point polyethylene (weight-average molecular weight 25 W, melting point 130° C.) | 230 | 220 | 190 | 42% | 58% | 6.3 | 6.4 |
| 23 | UHMWPE (weight-average molecular weight 60 W, melting point 140° C.) + polystyrene (weight-average molecular weight 20 W, glass transition temperature 100° C.) | Low-melting-point polyethylene (weight-average molecular weight 25 W, melting point 130° C.) | 230 | 220 | 190 | 42% | 58% | 6.3 | 6.4 |
| 24 | UHMWPE (weight-average molecular weight 60 W, melting point 140° C.) + poly(4-methyl-1-pentene) (molecular weight 20 W, melting point 220° C.) | Low-melting-point polyethylene (weight-average molecular weight 25 W, melting point 130° C.) | 230 | 220 | 190 | 42% | 58% | 6.3 | 6.4 |
| 25 | UHMWPE (weight-average molecular weight 60 W, melting point 140° C.) + poly(4-methyl-1-pentene) (molecular weight 30 W, melting point 250° C.) | Low-melting-point polyethylene (weight-average molecular weight 25 W, melting point 130° C.) | 230 | 220 | 190 | 42% | 58% | 6.3 | 6.4 |

| Comparative Example | Raw material of second porous substrate | Raw material of first porous substrate | Die orifice extrusion amount of extruder kg/h | Extrusion temperature of second porous substrate ° C. | Extrusion temperature of first porous substrate ° C. | Thickness proportion of first porous substrate | Thickness proportion of second porous substrate | Longitudinal drawing ratio | Transverse drawing ratio |
|---|---|---|---|---|---|---|---|---|---|
| 1 | UHMWPE (weight-average molecular weight 60 W, melting point 140° C.) | / | 230 | 190 | / | / | 100% | 7.0 | 6.5 |

| | | | | | | | | |
|---|---|---|---|---|---|---|---|---|
| 2 | / | Low-melting-point polyethylene (weight-average molecular weight 25 W, melting point 130° C.) | 230 | / | 170 | 100% | / | 6.0 | 6.0 |
| 3 | UHMWPE (weight-average molecular weight 60 W, melting point 140° C.) | Low-melting-point polyethylene (weight-average molecular weight 25 W, melting point 130° C.) | 230 | 190 | 160 | 42% | 58% | 6.0 | 6.0 |
| 4 | UHMWPE (weight-average molecular weight 60 W, melting point 140° C.) | UHMWPE (weight-average molecular weight 60 W, melting point 140° C.) | 230 | 240 | 220 | 42% | 58% | 6.0 | 6.0 |

(2) Testing Method

1. Method for Testing Interlayer Peeling Strength of Multilayer Separator

An separator sample with length of 100 mm and width of 20 mm were cut. The first surface of the separator was fixed on a platform by using double-sided adhesive. An adhesive tape with thickness of 50 μm was cut. One end of the adhesive tape was attached to one end of the second surface of the separator and the other end of the adhesive tape was attached to the platform to fix the separator on the platform. Then the adhesive tape with thickness of 50 μm was attached to the second surface of the separator. The multilayer separator was peeled at 180° by using the adhesive strength of the adhesive tape. The interlayer peeling strength of the separator was tested by adopting a high-speed railway tension machine (peeling speed 50 mm/min).

Figure 2:
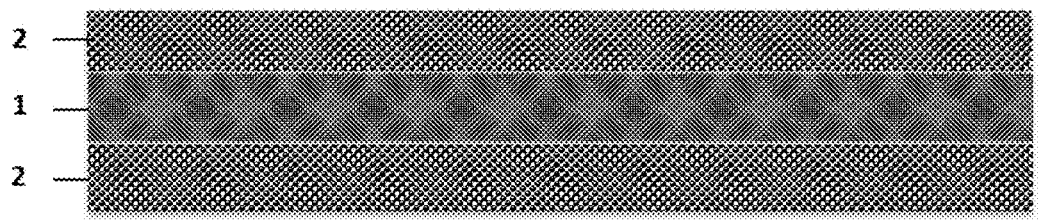
FIG. 2 illustrates a structural schematic view of a three-layer separator according to one embodiment of the present application.
Figure 3:
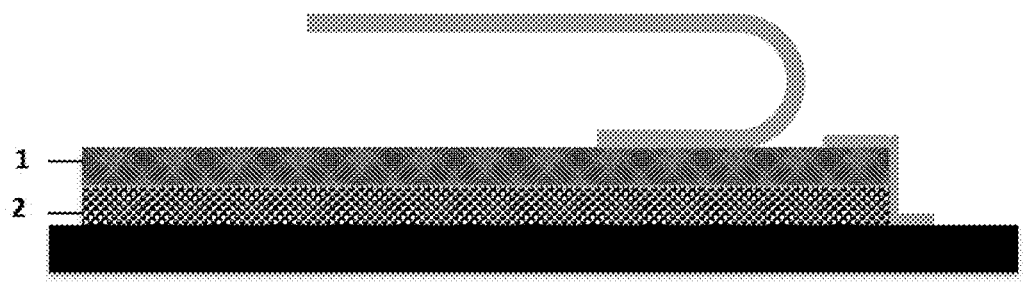
FIG. 3 illustrates a method for peeling off a two-layer separator according to one embodiment of the present application.
Figure 4:
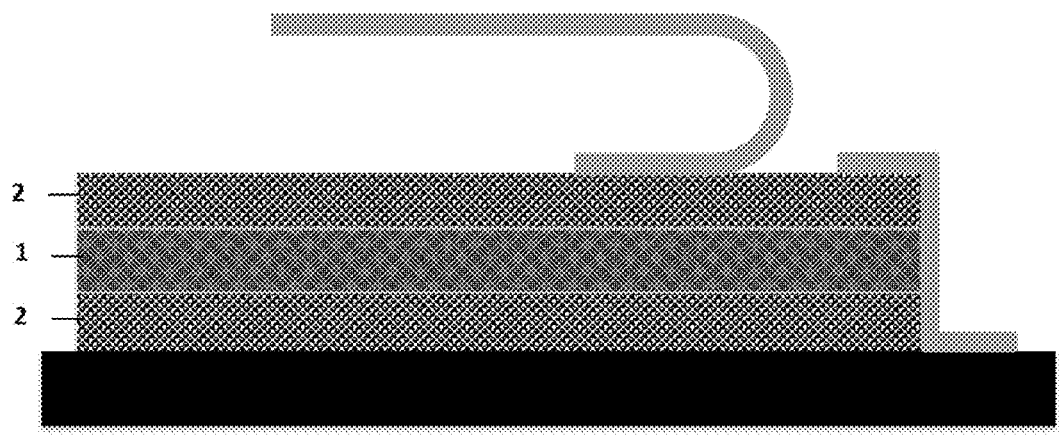
FIG. 4 illustrates a method for peeling off a three-layer separator according to one embodiment of the present application.

FIG. 3 illustrates a method for testing the interlayer peeling strength of the separator illustrated in FIG. 1. FIG. 4 illustrates a method for testing the interlayer peeling strength of the separator illustrated in FIG. 2.

2. Method for Testing Thickness

The thickness of the separator at 10-15 points was tested uniformly by using a "LITEMATIC" VL-50 one ten-thousandth accuracy thickness gauge (testing accuracy: 0.01 N). The average value was taken as the thickness of the separator. According to the method for measuring the interlayer peeling strength, each layer of the separator was peeled off, and the thickness of each layer was tested by adopting the same method.

3. Method for Testing Air Permeability

Five separator samples with length of 100 mm and width of 50 mm were cut. The time required for 100 cc gas to pass through the separators was respectively measured by adopting a Gurley 4110N air permeability tester. The average value was recorded as the air permeability of the separator (s/100 cc). According to the method for measuring the interlayer peeling strength, each layer of the separator was peeled off, and the air permeability of each layer was tested by adopting the same method.

4. Method for Testing Melting Point

The first melting peak T1 of the sample was measured by adopting a synchronous thermal analyzer (STA 449F3) by increasing temperature from 25° C. to 300° C. at a rate of 10° C./min, then the temperature was rapidly decreased to room temperature, then the second melting peak T2 of the sample was measured by increasing the temperature to 300° C. at a rate of 10° C./min, and T2 was recorded as the melting point of the sample.

5. Method for Testing Obturator Temperature and Broken Membrane Temperature

An separator sample with length of 30 mm and width of 30 mm was cut and sealed in a metal chamber connected with a cathode and an anode, and then test electrolyte was injected and sealed. The test electrolyte was prepared by adopting the following method: preparing solution by using lithium salt $LiPF_6$ and non-aqueous organic solvent (vinyl carbonate (EC):diethyl carbonate (DEC):propylene carbonate (PC):propyl propionate (PP):vinyl carbonate (VC)=20: 30:20:28:2, mass ratio) according to a mass ratio of 8:92.

The metal chamber was connected to a resistance recorder. The metal chamber was placed in a 200° C. oven, and the change of resistance of the sample with temperature in the metal chamber was recorded. The temperature corresponding to the resistance of the sample increased to 1000 ohms was recorded as the obturator temperature. With the increase of temperature, the temperature corresponding to the resistance of the sample decreased to 1000 ohms again was recorded as the broken membrane temperature.

6. Method for Testing Hotbox Pass Rate 100 lithium-ion battery samples were taken and charged at 0.5 C constant current to a voltage higher than 4.4V at room temperature, and further charged to a current lower than 0.05 C at a constant voltage of 4.4V to make it fully charged at 4.4V. The lithium-ion battery samples were put into an oven and heated to 140° C./150° C. at a rate of 5° C./min. If there was no smoke, fire or explosion, the lithium-ion battery was recorded as pass, otherwise it was recorded as no pass. 140° C. hotbox pass rate refers to a ratio of the number of lithium-ion batteries passing the test to the number of lithium-ion batteries. The same method was used to calculate the 150° C. hotbox pass rate.

(3) Test Results

Table 1 shows the structure and properties of the separators used in Examples 1-25 and Comparative Examples 1-4 and the performance of cells.

From Comparative Examples 1 and 2, it can be seen that when the separator consists of a single porous substrate, the safety of the cell is poor and cannot meet the needs of use. When the peeling strength between the first porous substrate and the second porous substrate of the multilayer separator is too small (smaller than 2 N/m) (as illustrated in FIG. 3), the separator cannot be processed; when the peeling strength between the first porous substrate and the second porous substrate of the multilayer separator is too large (greater than 50 N/m) (as illustrated in Comparative Example 4), the interlayer interaction is significant, which leads to the increase of the obturator temperature and the decrease of the broken membrane temperature, such that the lithium-ion battery is unable to pass the 15° C. hotbox test.

Examples 1-6 show the effect of the peeling strength between the first porous substrate and the second porous substrate of the multilayer separator on the performance of lithium-ion batteries. The results show that when the interlayer peeling strength is in the range of 2-50 N/m, the lithium-ion batteries perform well in the 140° C. hotbox test and has significantly improved safety.

Examples 2 and 7 show the effect of the number of layers of the multilayer separator on the performance of lithium-ion batteries. The results show that the two-layer and three-layer separators can achieve superior 140° C. hot box test pass rate. In the 150° C. hotbox test, the three-layer structure is more effective than the two-layer structure in improving the safety of lithium-ion batteries, and the safety is higher.

Examples 3 and 8-12 show the effect of the thickness of the multilayer separator on the performance of lithium-ion batteries. The results show that, with the increase of the thickness of the multilayer separator, the separator can fully close the pores, the resistance to thermal film breaking increases accordingly, and the 140° C. and 150° C. hotbox test pass rates are continuously improved.

Examples 3 and 13-17 show the effect of the thickness proportion of the first porous substrate to the second porous substrate on the performance of lithium-ion batteries. The results show that, with the increase of the thickness proportion of the first porous substrate or the decrease of the thickness proportion of the second porous substrate, the separator can fully close the pores, and the 140° C. and 150° C. hotbox test pass rates are continuously improved.

Examples 3 and 18-21 show the effect of the obturator temperature of the first porous substrate on the performance of lithium-ion batteries. The results show that, with the decrease of the obturator temperature, the obturator ability of the separator increases, and the 140° C. and 150° C. hotbox test pass rates are increased.

Examples 3 and 22-25 show the effect of the broken membrane temperature of the second porous substrate on the performance of lithium-ion batteries. The results show that with the increase of broken membrane temperature, the probability that melting and film breaking occur in the separator at high temperature continuously decreases, and the 140° C. and 150° C. hotbox test pass rates are continuously improved.

The above results show that keeping proper interlayer peeling strength, increasing the thickness of the separator, increasing the thickness proportion of the first porous substrate or decreasing the thickness proportion of the second porous substrate, increasing the obturator temperature of the first porous substrate and/or increasing the broken membrane temperature of the second porous substrate are helpful to improve the 140° C. and 150° C. hotbox test pass rates of lithium-ion batteries, and are helpful to improve the safety of lithium-ion batteries.

References throughout the specification to "embodiments," "partial embodiments," "one embodiment," "another example," "example," "specific example" or "partial examples" mean that at least one embodiment or example of the application comprises specific features, structures, materials or characteristics described in the embodiments or examples. Thus, the descriptions appear throughout the specification, such as "in some embodiments," "in an embodiment," "in one embodiment," "in another example," "in an example," "in a particular example" or "for example," are not necessarily the same embodiment or example in the application. Furthermore, the specific features, structures, materials or characteristics in the descriptions can be combined in any suitable manner in one or more embodiments or examples.

Although the illustrative embodiments have been shown and described, it should be understood by those skilled in the art that the above embodiments cannot be interpreted as limitations to the present application, and the embodiments can be changed, substituted and modified without departing from the spirit, principle and scope of the present application.

TABLE 1

| Variable setting | Example | Interlayer peeling strength N/m | Layers of separator | thickness of separator µm | Thickness proportion of first porous substrate | Thickness proportion of second porous substrate | Obturator temperature of first porous substrate ° C. | Obturator temperature of second porous substrate ° C. |
|---|---|---|---|---|---|---|---|---|
| Interlayer peeling strength N/m | 1 | 2 | 3 | 12 | 42% | 58% | 131 | 155 |
| | 2 | 10 | 3 | 12 | 42% | 58% | 131 | 155 |
| | 3 | 20 | 3 | 12 | 42% | 58% | 131 | 155 |
| | 4 | 30 | 3 | 12 | 42% | 58% | 131 | 155 |
| | 5 | 40 | 3 | 12 | 42% | 58% | 131 | 155 |
| | 6 | 50 | 3 | 12 | 42% | 58% | 131 | 155 |
| Layers of separator | 7 | 20 | 2 | 12 | 42% | 58% | 131 | 155 |
| | 3 | 20 | 3 | 12 | 42% | 58% | 131 | 155 |
| Thickness of separator µm | 8 | 20 | 3 | 5 | 42% | 58% | 131 | 155 |
| | 9 | 20 | 3 | 7 | 42% | 58% | 131 | 155 |
| | 10 | 20 | 3 | 9 | 42% | 58% | 131 | 155 |
| | 3 | 20 | 3 | 12 | 42% | 58% | 131 | 155 |
| | 11 | 20 | 3 | 20 | 42% | 58% | 131 | 155 |
| | 12 | 20 | 3 | 30 | 42% | 58% | 131 | 155 |
| Thickness proportion of first porous substrate/ second porous substrate | 13 | 20 | 3 | 12 | 5% | 95% | 131 | 155 |
| | 14 | 20 | 3 | 12 | 10% | 90% | 131 | 155 |
| | 15 | 20 | 3 | 12 | 25% | 75% | 131 | 155 |
| | 3 | 20 | 3 | 12 | 42% | 58% | 131 | 155 |
| | 16 | 20 | 3 | 12 | 58% | 42% | 131 | 155 |
| | 17 | 20 | 3 | 12 | 70% | 30% | 131 | 155 |

TABLE 1-continued

| Variable setting | | | | | | | | |
|---|---|---|---|---|---|---|---|---|
| Obturator temperature of first porous substrate °C. | 3 | 20 | 3 | 12 | 42% | 58% | 131 | 155 |
| | 18 | 20 | 3 | 12 | 42% | 58% | 110 | 155 |
| | 19 | 20 | 3 | 12 | 42% | 58% | 120 | 155 |
| | 20 | 20 | 3 | 12 | 42% | 58% | 137 | 155 |
| Obturator temperature of second porous substrate °C. | 3 | 20 | 3 | 12 | 42% | 58% | 131 | 155 |
| | 21 | 20 | 3 | 12 | 42% | 58% | 131 | 145 |
| | 22 | 20 | 3 | 12 | 42% | 58% | 131 | 170 |
| | 23 | 20 | 3 | 12 | 42% | 58% | 131 | 190 |
| | 24 | 20 | 3 | 12 | 42% | 58% | 131 | 220 |
| | 25 | 20 | 3 | 12 | 42% | 58% | 131 | 250 |

Parameter setting

| Variable setting | Obturator temperature of separator °C. | Broken membrane temperature of separator °C. | Air permeability of separator s/100 cc | Air permeability proportion of first porous substrate | Air permeability proportion of second porous substrate | Broken membrane temperature of first porous substrate °C. | Battery performance 140° C. hotbox pass rate | 150° C. hotbox pass rate |
|---|---|---|---|---|---|---|---|---|
| Interlayer peeling strength N/m | 130 | 155 | 250 | 60% | 40% | 143 | 100% | 100% |
| | 129 | 153 | 250 | 60% | 40% | 142 | 100% | 90% |
| | 131 | 155 | 250 | 60% | 40% | 142 | 100% | 80% |
| | 130 | 157 | 250 | 60% | 40% | 143 | 100% | 60% |
| | 131 | 152 | 250 | 60% | 40% | 143 | 100% | 50% |
| | 131 | 153 | 250 | 60% | 40% | 142 | 100% | 40% |
| Layers of separator | 130 | 154 | 250 | 60% | 40% | 143 | 90% | 40% |
| | 131 | 155 | 250 | 60% | 40% | 142 | 100% | 80% |
| Thickness of separator μm | 130 | 152 | 100 | 60% | 40% | 142 | 60% | 10% |
| | 129 | 155 | 130 | 62% | 38% | 143 | 65% | 15% |
| | 130 | 153 | 190 | 63% | 37% | 143 | 70% | 40% |
| | 131 | 155 | 250 | 60% | 40% | 142 | 100% | 80% |
| | 132 | 156 | 350 | 57% | 43% | 143 | 100% | 90% |
| | 131 | 155 | 480 | 58% | 42% | 142 | 100% | 90% |
| Thickness proportion of first porous substrate/second porous substrate | 129 | 155 | 190 | 16% | 84% | 142 | 30% | 10% |
| | 131 | 156 | 185 | 24% | 76% | 143 | 50% | 10% |
| | 129 | 153 | 195 | 38% | 62% | 143 | 80% | 30% |
| | 131 | 155 | 250 | 60% | 40% | 142 | 100% | 80% |
| | 130 | 152 | 255 | 69% | 31% | 142 | 100% | 85% |
| | 132 | 155 | 280 | 79% | 21% | 143 | 100% | 85% |
| Obturator temperature of first porous substrate °C. | 131 | 155 | 250 | 60% | 40% | 142 | 100% | 80% |
| | 108 | 153 | 330 | 67% | 33% | 135 | 100% | 100% |
| | 122 | 155 | 270 | 67% | 33% | 138 | 100% | 100% |
| | 135 | 153 | 205 | 49% | 51% | 153 | 60% | 50% |
| Obturator temperature of second porous substrate °C. | 131 | 155 | 250 | 60% | 40% | 142 | 100% | 80% |
| | 130 | 145 | 260 | 58% | 42% | 142 | 100% | 50% |
| | 131 | 164 | 250 | 60% | 40% | 142 | 100% | 85% |
| | 132 | 185 | 230 | 65% | 35% | 143 | 100% | 90% |
| | 129 | 215 | 220 | 68% | 32% | 143 | 100% | 100% |
| | 131 | 252 | 220 | 68% | 32% | 144 | 100% | 100% |

| Comparative Example | Interlayer peeling strength N/m | Layers of separator | Thickness of separator μm | Thickness proportion of first porous substrate | Thickness proportion of second porous substrate | Obturator temperature of first porous substrate °C. | Obturator temperature of second porous substrate °C. |
|---|---|---|---|---|---|---|---|
| 1 | / | 1 | 12 | / | 100% | / | 155 |
| 2 | / | 1 | 12 | 100% | / | 131 | / |
| 3 | 1 | 3 | 12 | 42% | 58% | 131 | 155 |
| 4 | 60 | 3 | 12 | 42% | 58% | 136 | 145 |

| Comparative Example | Obturator temperature of separator °C. | Broken membrane temperature of separator °C. | Air permeability of separator s/100 cc | Air permeability proportion of first porous substrate | Air permeability proportion of second porous substrate | Broken membrane temperature of first porous substrate °C. | 140° C. hotbox pass rate | 150° C. hotbox pass rate |
|---|---|---|---|---|---|---|---|---|
| 1 | / | 155 | 250 | / | 100% | / | 20% | 0% |
| 2 | 131 | / | 250 | 100% | / | 143 | 40% | 0% |

TABLE 1-continued

| 3 | 131 | 155 | 250 | 60% | 40% | 155 | / | / |
| 4 | 136 | 145 | 250 | 60% | 40% | 145 | 30% | 0% |

What is claimed is:

1. A multilayer separator, comprising:
   at least one first porous substrate; and
   at least one second porous substrate,
   wherein the peeling strength between the first porous substrate and the second porous substrate is in a range of 2 N/m to 30 N/m, and the first porous substrate has an obturator temperature of lower than 135° C.; and
   wherein the multilayer separator has an air permeability of 50 s/100 cc to 1000 s/100 cc, and wherein the air permeability of the first porous substrate is 30% to 80% of the air permeability of the multilayer separator, and the air permeability of the second porous substrate is 20% to 70% of the air permeability of the multilayer separator.

2. The multilayer separator according to claim 1, wherein the second porous substrate has a broken membrane temperature of higher than 145° C.

3. The multilayer separator according to claim 1, wherein the multilayer separator has a thickness of 5 μm to 30 μm, and wherein the thickness of the first porous substrate is 10% to 70% of the thickness of the multilayer separator, and the thickness of the second porous substrate is 30% to 90% of the thickness of the multilayer separator.

4. The multilayer separator according to claim 1, wherein the multilayer separator has an obturator temperature of lower than 135° C. and broken membrane temperature of higher than 145° C.

5. The multilayer separator according to claim 1, wherein the material of the first porous substrate comprises at least one or more of: high-density polyethylene, low-density polyethylene, linear low-density polyethylene, medium-density polyethylene, ultrahigh-molecular-weight polyethylene and polyethylene wax with an average molecular weight of 1000 g/mol to 20000 g/mol.

6. The multilayer separator according to claim 1, wherein the material of the second porous substrate comprises at least one or more of: ultrahigh-molecular-weight polyethylene, high-density polyethylene, polypropylene, polyethylene terephthalate, polyphenylene sulfide, cellulose, polyimide, polystyrene, poly(4-methyl-1-pentene), polymethyl methacrylate, polyvinylidene fluoride, polyvinylidene fluoride-hexafluoropropylene, polytetrafluoroethylene and polysulfone.

7. The multilayer separator according to claim 1, wherein the multilayer separator further comprises at least one coating on one side or two sides of the multilayer separator, and the coating comprises one or two of inorganic particles and polymers.

8. An electrochemical device, comprising:
   a cathode;
   an anode; and
   a multilayer separator located between the cathode and the anode, wherein the multilayer separator comprises:
   at least one first porous substrate; and
   at least one second porous substrate,
   wherein the peeling strength between the first porous substrate and the second porous substrate is in a range of 2 N/m to 30 N/m, and the first porous substrate has an obturator temperature of lower than 135° C.; and
   wherein the multilayer separator has an air permeability of 50 s/100 cc to 1000 s/100 cc, and wherein the air permeability of the first porous substrate is 30% to 80% of the air permeability of the multilayer separator, and the air permeability of the second porous substrate is 20% to 70% of the air permeability of the multilayer separator.

9. The electrochemical device according to claim 8, wherein the second porous substrate has a broken membrane temperature of higher than 145° C.

10. The electrochemical device according to claim 8, wherein the multilayer separator has a thickness of 5 μm to 30 μm, and wherein the thickness of the first porous substrate is 10% to 70% of the thickness of the multilayer separator, and the thickness of the second porous substrate is 30% to 90% of the thickness of the multilayer separator.

11. The electrochemical device according to claim 8, wherein the multilayer separator has an obturator temperature of lower than 135° C. and broken membrane temperature of higher than 145° C.

12. The electrochemical device according to claim 8, wherein the material of the first porous substrate comprises at least one or more of: high-density polyethylene, low-density polyethylene, linear low-density polyethylene, medium-density polyethylene, ultrahigh-molecular-weight polyethylene and polyethylene wax with an average molecular weight of 1000 g/mol to 20000 g/mol.

13. The electrochemical device according to claim 8, wherein the material of the second porous substrate comprises at least one or more of: ultrahigh-molecular-weight polyethylene, high-density polyethylene, polypropylene, polyethylene terephthalate, polyphenylene sulfide, cellulose, polyimide, polystyrene, poly(4-methyl-1-pentene), polymethyl methacrylate, polyvinylidene fluoride, polyvinylidene fluoride-hexafluoropropylene, polytetrafluoroethylene and polysulfone.

14. The electrochemical device according to claim 8, wherein the multilayer separator further comprises at least one coating on one side or two sides of the multilayer separator, and the coating comprises one or two of inorganic particles and polymers.

15. An electronic device, comprising an electrochemical device that includes:
   a cathode;
   an anode; and
   a multilayer separator located between the cathode and the anode, wherein the multilayer separator comprises:
   at least one first porous substrate; and
   at least one second porous substrate,
   wherein the peeling strength between the first porous substrate and the second porous substrate is in a range of 2 N/m to 30 N/m, and the first porous substrate has an obturator temperature of lower than 135° C.; and
   wherein the multilayer separator has an air permeability of 50 s/100 cc to 1000 s/100 cc, and wherein the air permeability of the first porous substrate is 30% to 80% of the air permeability of the multilayer separator, and the air permeability of the second porous substrate is 20% to 70% of the air permeability of the multilayer separator.

\* \* \* \* \*